Nov. 28, 1933.    C. R. POST    1,937,294
DENTAL IMPLEMENT
Filed Sept. 27, 1929
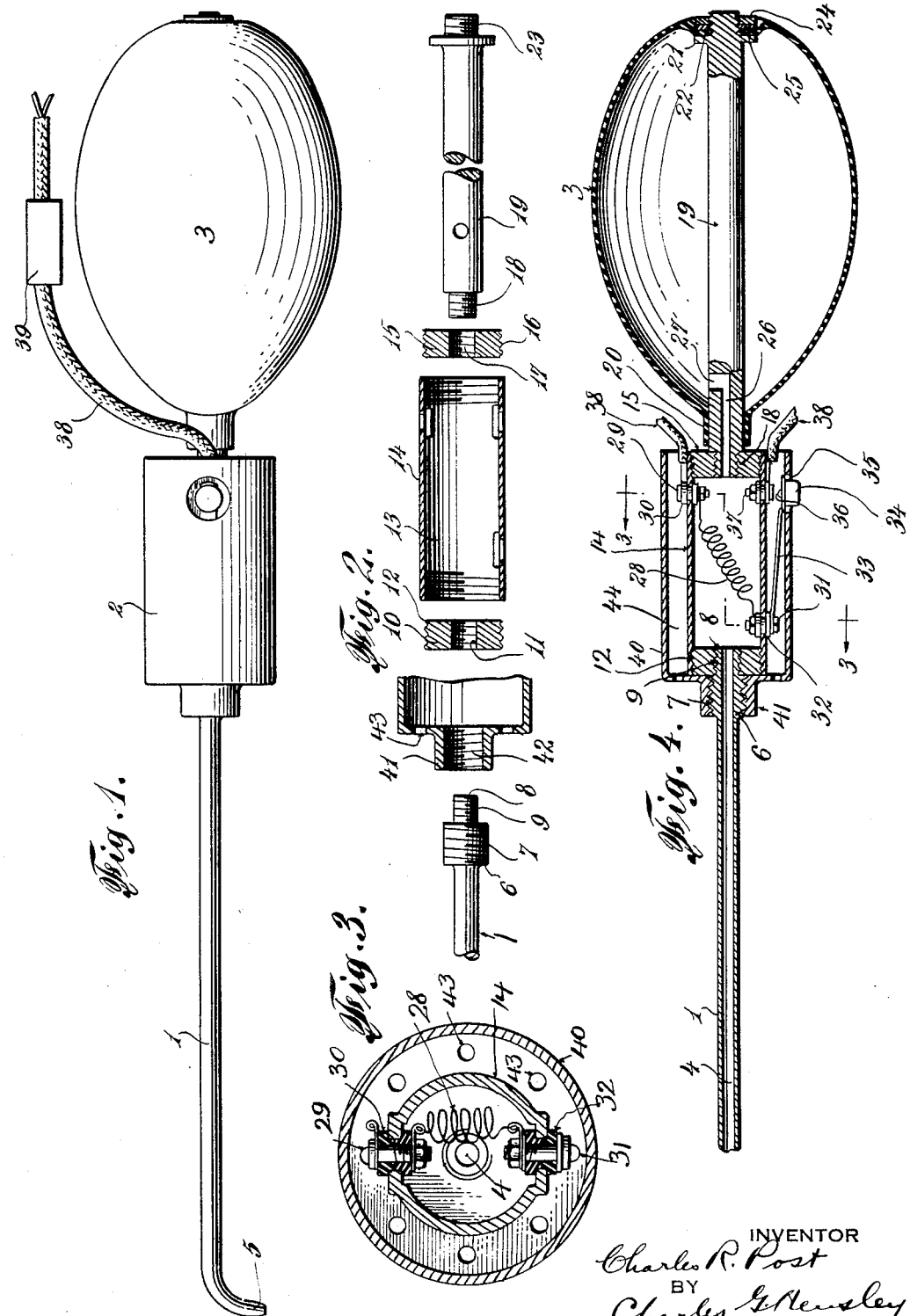
INVENTOR
Charles R. Post
BY
Charles G. Hensley
ATTORNEY Patented Nov. 28, 1933

1,937,294

UNITED STATES PATENT OFFICE 1,937,294

DENTAL IMPLEMENT

Charles R. Post, Scarsdale, N. Y.

Application September 27, 1929
Serial No. 395,528

3 Claims. (Cl. 128—257)

The present invention relates to a dental implement and more particularly to a device for applying heated air into tooth cavities and for general use wherever warm or hot air is necessary in dental work. It has been common practice for dentists to employ a hot air implement consisting of a tube having a compressible bulb on one end for injecting heated air into tooth cavities, the tubular portion of the heater being held over or in a gas flame to heat the air within the device preparatory to its being injected into the tooth cavity. The object of my invention is to provide an implement of this character which can be used in the same manner as the ordinary gas heated implement but the present device is provided with means for electrically heating the air in order that the use of the gas flame may be eliminated and the operation made simpler and more convenient. In the present device the air is heated by an electrical resistance member of simple construction, which is so arranged within the device that the air circulates around the electrical heating unit when drawn in by the expansion of the compressible bulb and it again passes around and through the heating element when the bulb is pressed to inject the heated air into a tooth cavity. The air in the present device may be heated to any desired degree almost instantly, so that it is unnecessary to hold the device over a gas flame for heating. In other words, the device is always ready for use.

The air to be heated and injected is drawn into the device and ejected from it by a hand operated member, preferably in the form of a compressible rubber bulb which may be squeezed by the hand in which the implement is held, the bulb being compressed to eject the air and when released, air is drawn into the device by the expansive action of the bulb. The air as it is drawn in and ejected, passes through and around the heating element, which is of an electrical type, and as the heating element is contained within the device its efficiency for heating the air is much greater than the open gas flame ordinarily used for such implements.

Another object of the present invention is to provide an implement of the character described, containing an electric heating element, wherein the tube for injecting the heated air into a tooth cavity is insulated from the chamber containing the heating element, in order that the tube shall not become excessively heated. In the ordinary gas type of implement the tube is directly heated over a gas flame and it is necessary, in using the device, to keep the tube from coming into contact with the mouth tissues as otherwise they might be burned by the heated tube. In the present device, by insulating the tube from the chamber containing the heating element, the tube itself does not become excessively heated and it will, therefore, not burn or scorch the mouth tissues if it comes into contact with them while being manipulated in relation to the tooth. This renders the present device safer to use and also quicker as the operator is not obliged to use care in avoiding contact with the mouth tissues.

Another object of my device is to provide a chamber containing the electric heating element having double spaced walls between which air may circulate to prevent the exterior wall from becoming excessively heated so that neither the operator nor the patient will be burned by contact with the outer wall of the heating chamber.

Another object of my invention is to provide, in connection with the bulb for inhaling and exhaling air, a rigid support for the bulb which will serve as a handle and permit the compression and expansion of the bulb and at the same time allow the operator to control the position of the implement as a whole unaffected by the compression and expansion of the bulb. In the gas heated implements heretofore used the implement was supported in the hand entirely by the grip upon the bulb, and due to the flexible character of the bulb the position of the implement was unsteady, especially while the bulb was being compressed and expanded. In the present case, however, the ejecting tube and in fact the entire implement may be held steadily notwithstanding the compression and expansion of the bulb, by reason of the guiding action of the stem or handle on which the bulb is mounted.

Another object of the invention is to provide an implement of the character described wherein the parts forming the compartment for the heating element may be easily assembled and disassembled for the purpose of removing and renewing the heating element or for other purposes.

Another object is to provide a convenient switch which may be manipulated by the same hand which operates the bulb, for the purpose of turning on and off the current which operates the heating element. Other features and advantages will be set forth in the following detailed description of my invention.

In the drawing forming part of this application,

Figure 1 is an elevation of an implement embodying my invention in the preferred form, the device being shown on an enlarged scale, Figure 2 is a longitudinal, sectional view of separate parts of the device in condition for assembling, Figure 3 is a sectional view taken on the line 3—3 of Figure 4, and Figure 4 is a longitudinal, sectional view of the device in assembled condition.

The present implement consists primarily of a tubular member 1 from which the heated air may be injected into a tooth cavity; of a chamber or casing 2 preferably disposed between the tube and the bulb, and preferably near one end of the latter; and of the bulb 3 preferably made of rubber and adapted to be compressed by the hand to eject air from within the device and upon release of pressure therefrom to expand under its own resiliency and draw air into the device.

The tubular member 1 which has a central bore 4 for the passage of air completely through it may have any type of spout and for the purpose of illustration I have shown a curved spout portion 5 adapted to be inserted into or adjacent a tooth cavity for directing the discharge of the heated air therein. This tube is shown provided adjacent one end with an enlargement 6 having an external thread 7 thereon and following this there is a reduced or neck portion 8 which also has an exterior thread 9 thereon. The inner shell member which directly encloses the heating element is composed partly of an end plug or member 10 having a bore provided with an internal thread 11 which is adapted to be screwed onto the reduced neck 8 of the tubular member 1 whereby the latter and the plug 10 are detachably secured to each other.

This plug or end member 10 is also provided with an external thread 12 which is adapted to screw into one threaded end of the bore 13 of a cylindrical and preferably metallic member 14 which forms the major portion of the inner chamber containing the heating element. At the opposite end of this cylindrical member 14 there is another end member or plug 15 which is provided with an external thread 16 to be screwed into the right hand threaded end of the bore 13 to form a closure for one end of this cylindrical shell.

The end member or plug 15 is provided with an internal thread 17 into which is screwed the reduced and threaded end 18 of the stem or handle member 19 whereby the latter is rigidly connected with the shell of the heating member. The stem 19 extends outwardly, preferably in axial alignment with the plug 15 and the compressible bulb 3 has a tubular or neck portion 20 which is slid over the free or projecting end of the stem until the neck portion is positioned adjacent the plug 15. Near the outer or free end this stem has a lateral flange 21 adapted to seat against the inner surface of the wall of the bulb around the aperture 22 and the end of the stem beyond this flange is provided with a thread 23 to receive a nut 24 which clamps the outer washer 25 against the outer surface of the wall of the bulb. In other words, the stem 19 passes through an aperture in the end of the bulb and the wall surrounding this aperture is clamped on opposite sides between the flange 21 of the stem and the washer and nut 25, 24 to form an air tight connection between the stem and bulb. The stem is provided with a central bore 26 extending longitudinally thereof and running from the end of the stem which is threaded into the plug 15, to a point within the bulb where it communicates through the lateral openings 27 with the air space within the bulb.

The electrical heating element may be of a very simple form and for this purpose I have shown a coil of resistance wire 28 having one end secured to a binding post 29 which is mounted in the insulating bushing 30 secured through an aperture in the wall of the cylinder 14. The opposite end of the resistance wire is connected with a similar binding post 31 also mounted in a bushing 32 which latter is attached to another aperture of the cylinder wall 14. There is a spring arm 33 which is also fastened to the binding post 31 and the free end of this spring member is provided with a button 34 which projects through an opening 35 in the outer shell 14 where it is accessible for operation by the finger or thumb of the operator. The member 33 which acts as a switch, has a contact point 36 which is adapted to make contact with the binding post 37 when pressed inwardly by pressure exerted on the button 34. There is a cable 38 which may be connected with a socket or outlet of an electric supply circuit and if desired a rheostat 39 may be connected in the cable to limit the amount of current which may flow through the implement. One feed wire of this cable is connected with the binding post 29, and therefore with one end of the resistance coil, while the other wire of the cable is connected with the binding post 37 and will therefore be connected with one side of the resistance coil whenever the switch arm 33 is pressed inwardly.

I prefer to provide an outer shell to enclose the heater casing and for this purpose I have shown a cylindrical member 40 which is open at one end, i. e., the end adjacent the bulb; and at its other end it has a neck or stem 41 provided with an internal thread 42 adapted to be screwed onto the enlarged portion 6 of the tube 1.

This shell is shown provided with apertures 43 to permit air to enter and circulate in the annular space 44 between the inner shell member 14 and the outer shell member 40 to prevent the outer shell from becoming heated to a point where the fingers might otherwise become burned if brought into contact therewith.

In assembling the device the following operations may be carried out, although not necessarily all in the order here named. The binding posts and bushings 29, 30, 31, 32 and 37 are assembled in the shell 14 and the resistance member is connected at opposite ends to the posts 29, 31. The plug 10 may then be screwed onto the portion 8 of the tube until it seats against the front shoulder of the enlargement 6. The cylindrical shell member 14 with the resistance unit assembled therein may now be screwed onto the external thread 12 of the plug 10. If the switch arm 33 was not previously attached to the binding post 31 it may now be assembled upon or attached to it. The end plug 15 may now be screwed into the right hand end of the cylindrical member 14 after which the threaded end 18 of the stem 19 may be screwed into the bore of this plug. The shell member 40 may now be passed over the left or free end of the tube 1 and moved along this tube until the threaded neck 41 reaches the enlargement 6, whereupon the shell member is screwed onto the thread 7 of the enlargement. This shell will now surround the inner shell 14 and will be spaced from it to provide the annular space 44 in which air may circulate to prevent the outer shell member from becoming excessively heated.

When the outer shell member is screwed into place in the manner described, the button 34 on the switch 33 will project through the aperture 35 so that pressure on the outer end of this button will bring the contact member 36 of the switch into closed contact with the binding post 37. Before the outer shell member 40 is screwed into place the feed wires 38 are attached to the respective binding posts 29, 37.

The bulb 3 is applied to the stem by passing the tubular end 20 over the free end of the stem and moving the bulb along until it reaches the position shown in Figure 4. The flange 21 may then be seated against the inner surface or wall of the bulb around the aperture 22 and the washer 25 is then applied over the end of the stem which projects through the bulb and the nut 24 is screwed down to form an air tight connection between the flange 21 and the wall of the bulb.

Operation

The utensil may be held by grasping the bulb in one hand and with the finger or thumb of the same hand the button 34 is pressed to close the contact 36 with the binding post 37 whereupon a circuit is established between the opposite feed wires and through the resistance member 28. The passage of the current through this resistance member will cause the latter to be heated and the heat will be directly conducted to the air within the utensil. If the bulb is squeezed and then released, the air is first ejected from the space within the bulb, and upon the release of the bulb fresh air is drawn in through the tube, thence past the heating element, and into the bulb, whereupon the greater portion or the entire inner portion of the whole device will be filled with heated air.

The next time the bulb is compressed, this heated air will be forced out from the bulb and from the chamber 13 through the tube 1 to be discharged at the nozzle end 5 into a tooth cavity or against a tooth or wherever the heated air is to be utilized. Each time the bulb is compressed and released, heated air is ejected and new air is drawn in to take its place and to be heated by the resistance element. After the first operation of the bulb, the air at each operation twice passes the heating element; once when it is drawn in and again when it is ejected; and naturally the air is subjected to the action of the heating member between the periods when the bulb is operated.

While the stem 19 is not absolutely necessary to the operation of the device, it is preferably employed in order that the implement may be supported through the stem, so that it may be held steadier than if the entire support took place through the flexible bulb, as in the ordinary gas heated implement. It will be obvious that this feature of the stem in conjunction with the bulb may be used separately from the electrical features herein set forth. By employing a plug 10 made of low heat conducting material such as fiber, the tube 1 will not be excessively heated by conduction from the resistance unit, and from the shell 14 so that notwithstanding the fact that the heated air passes through this tube as it is ejected, the tube will not become heated to a point where it will burn the mouth tissues if it comes into contact therewith while the implement is in use.

Preferably, the plug 15 is also made of a low heat conducting material such as fiber, in order that the stem 19 will not be excessively heated by conduction and this protects the bulb from excessive heating. In other words, if the resistance coil has a current passing through it for a considerable time while the implement is otherwise inactive, neither the bulb nor the tube 1 will become excessively heated by conduction through the mechanical parts of the device. Such heat as passes to either of these members is through the air contained within the device and this will not cause excessive heating of the tube or bulb.

Whenever the heating unit is to be removed for replacement, cleaning or other purposes, the outer shell 40 may be first removed by unscrewing it from the enlargement 6 and the shell member 14 may be then unscrewed from the plug 10. If desired, the plug 15 may be unscrewed from one end of the cylinder 14 whereupon the resistance unit is accessible for removal and replacement. These operations are reversed to reassemble the device after replacement of the heating unit. It will be apparent from this that the resistance unit may be replaced very quickly and at a very moderate cost. By employing a simple bare-wire coil as a heating unit the latter is reduced to the simplest and most inexpensive type.

Having described my invention, what I claim is:

1. An implement of the character described having an air discharge nozzle adapted to be inserted into the mouth, a tubular casing, an electric heating element disposed in said casing, a plug of heat insulating material attached to one end of said casing, said nozzle being attached to said plug, a compressible bulb for inhaling and exhaling air in said implement, and a second plug of heat insulating material connected to the opposite end of said casing to said first plug and to which said bulb is attached.

2. An implement of the character described having an air discharge nozzle, a casing connected thereto, a compressible bulb connected with said casing to inhale and exhale air in said casing, an electric heating element disposed in said casing and arranged to heat the air inhaled and exhaled by said bulb, and an outer shell surrounding said casing and spaced therefrom to form an air circulating space between said inner and outer casing and through which space air disassociated from the air in said casing is adapted to circulate and to protect said outer casing from becoming overheated.

3. An implement of the character described having an air discharge nozzle provided with a threaded end and an enlarged threaded portion adjacent said threaded end, a shell adapted to be screwed onto said threaded end, an electric heating element in said shell, a compressible bulb connected with said shell and arranged to inhale and exhale air in said shell and an outer shell member having a tubular portion adapted to be screwed onto said enlargement of said nozzle member, said outer shell member being disposed in annularly spaced relation to said inner shell and open at least at one end to permit circulation of air disassociated from the air in said inner shell between said shell members to serve as a cooling agent to prevent excessive heating of said outer shell member.

CHAS. R. POST.